July 17, 1928.
E. PUGH
1,677,206
METHOD OF ELECTRIC WELDING
Filed April 17, 1926
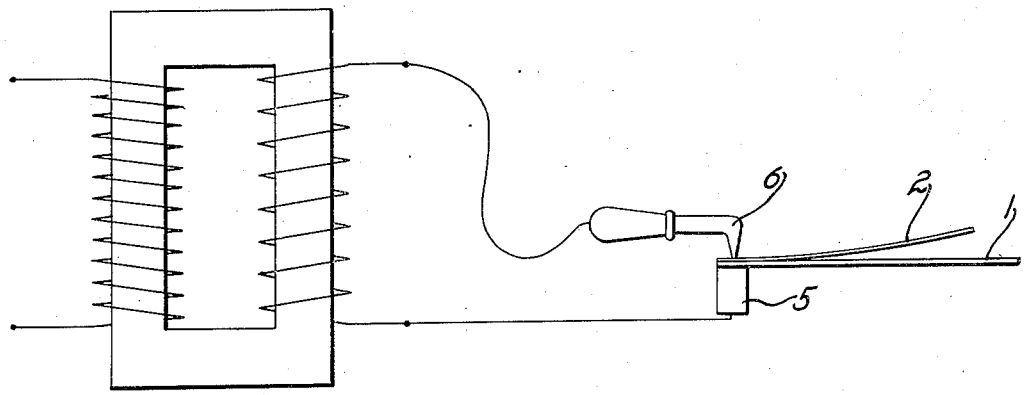
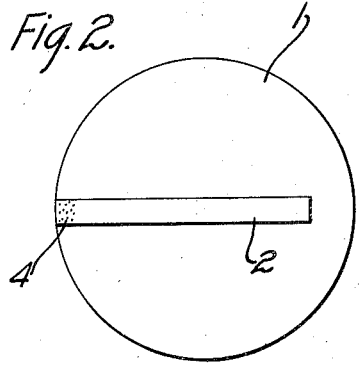
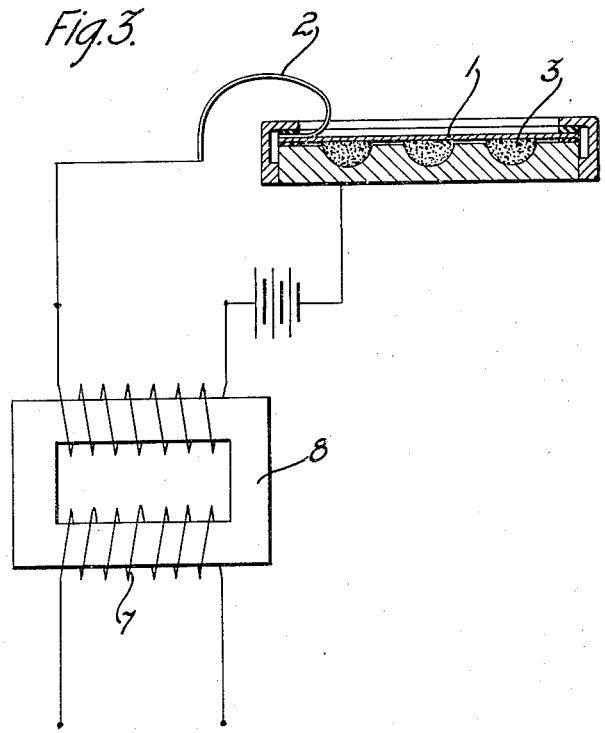
Inventor
Emerson Pugh
by [signature]
Att'y.

Patented July 17, 1928.

1,677,206

UNITED STATES PATENT OFFICE.

EMERSON PUGH, OF CHICAGO, ILLINOIS, ASSIGNOR TO WESTERN ELECTRIC COMPANY, INCORPORATED, OF NEW YORK, N. Y., A CORPORATION OF NEW YORK.

METHOD OF ELECTRIC WELDING.

Application filed April 17, 1926. Serial No. 102,650.

This invention relates to methods of welding, and more particularly to methods of electrically welding metal parts.

It is sometimes desirable to electrically weld metal parts without destroying the smoothness and other physical characteristics of the surfaces thereof. An instance of this nature is encountered in certain types of electrical sound translating apparatus, such as a telephonic transmitter used in an audiophone and having a plated diaphragm of duralumin to one surface of which an electrical conductor in the form of a very thin strip of gold foil is electrically welded.

It is essential for the proper functioning of the transmitter that the surfaces of the welded parts be free from pin holes or pits which might be produced during the welding operation.

Objects of the invention are to provide a simple method of welding parts, particularly thin metal parts, without deleteriously deforming the surface thereof.

In order to attain these objects, in accordance with one embodiment of the invention, the metallic electrodes connected with the welding circuit are each covered with a thin layer or film of graphite which keeps the metallic surfaces of the electrodes and the parts being welded separated and at the same time retains the advantages to be gained by using metallic electrodes.

It is believed that a complete understanding of the invention may be had from the following description taken in conjunction with the accompanying drawing, in which:

Fig. 1 shows diagrammatically the application of the method to the welding of a strip of gold leaf to a gold plated duralumin diaphragm;

Fig. 2 is a plan view of the diaphragm with the strip of gold leaf welded thereto, and Fig. 3 is a cross-sectional view of an audiophone transmitter showing the diaphragm connected in the primary circuit of an audiophone set of the type shown in the copending application of G. R. Lum, Serial No. 721,509, filed June 21, 1924.

In the construction of audiophone transmitters it is desirable to make the transmitter as small and compact as possible. The diaphragm 1 is, therefore, used as one transmitter electrode and consists of a sheet of duralumin about .01 inches in thickness and 1.125 inches in diameter. In order to obtain a good contact between the diaphragm 1 and the granulated carbon 3 when the diaphragm is in vibration, the diaphragm is gold plated. When the diaphragm is used in this way as one of the transmitter electrodes it is necessary to attach a conductor to the diaphragm in such a manner that it will not interfere with or dampen the vibrations of the diaphragm. For this purpose a strip of gold foil 2 having a thickness of .005 inch is employed. The strip of gold foil 2 is welded to the diaphragm 1 as indicated at 4.

In the process of welding the gold foil to the diaphragm, it appears that in spite of the fact that the lower electrode 5 is made much larger than the area to be welded it does not sufficiently reduce the current density to always prevent the adhesion of the gold plate to the electrode. The adhesion may produce pits or pin-holes in the gold plate which would cause the diaphragm to produce a so-called "frying" sound in the receiver associated therewith.

The application of a non-metallic substance, as for instance a thin layer of graphite, such as may be made by rubbing a soft pencil over the surface of the electrode, produces a film of material which is a conductor of electricity, but which will not alloy with or adhere to the gold plate sufficiently to cause it to tear loose when removed from the electrode and thus permits the weld to be made without any damage to the surface of the gold plated diaphragm.

This method permits the use of a large metallic electrode 5 which serves to conduct heat away from the lower side of the diaphragm and thereby prevents excessive heating at the point of contact.

The application of the method is as follows: The electrodes 5 and 6 are coated with a thin film of graphite. The diaphragm 1 and the gold leaf strip 2 are then placed on the electrode 5 and the electrode 6 is brought in contact with the gold leaf strip. A current of about 150 amperes is caused to flow through the comparatively small area of the electrode 6 which causes a concentration of the current where this electrode contacts and produces a weld between the gold plated diaphragm and the gold leaf.

Fig. 3 illustrates the diaphragm operatively mounted in the primary circuit of an audiphone set of the type disclosed in the copending application referred to above. The vibration of the diaphragm causes a variation of the resistance of the granulated carbon and an alternating current is thereby produced in the secondary 7 of the transformer 8 as is well understood in the art. The secondary of the transformer is connected to the output circuit of the set.

It will be understood that the application of the invention herein described and illustrated is merely by way of example and that the invention is capable of many modifications without departing from the spirit and scope of the invention.

What is claimed is:

1. The method of welding thin metals which consists in covering a metallic electrode with a thin layer of a non-metallic conducting substance to prevent adhesion to the work, positioning the metals and the electrode in electrically conducting relation separated by the layer of the non-metallic conducting substance and passing a current through the electrode and the metals.

2. The method of welding gold foil, which consists of applying a thin layer of graphite to a metallic electrode, positioning the foil and the electrode in electrically conducting relation separated by the layer of graphite, and passing a current through the electrode and the foil.

In witness whereof, I hereunto subscribe my name this 31 day of March A. D., 1926.

EMERSON PUGH.